UNITED STATES PATENT OFFICE.

CHARLES J. REED, OF PHILADELPHIA, PENNSYLVANIA.

PROCESS OF ELECTROLYTICALLY DISSOLVING IRON-OXID SCALE.

No. 827,179.  Specification of Letters Patent.  Patented July 31, 1906.

Application filed June 26, 1905. Serial No. 267,129.

*To all whom it may concern:*

Be it known that I, CHARLES J. REED, a citizen of the United States, residing at Philadelphia, in the county of Philadelphia and State of Pennsylvania, have invented certain new and useful Improvements in Processes of Electrolytically Dissolving Iron-Oxid Scale, of which the following is a specification.

Various electrolytic methods have been proposed for removing the oxid scale from iron sheets, rods, and wire. In some of these the iron article is made the anode in an electrolyte of acid or an acid salt. The scale is thus dissolved more rapidly than in the usual pickle-bath; but the action is apt to be irregular, the activity of the acid anion frequently causing pitting of the iron. Furthermore, the gain in time is more than offset by the cost of the electric current. In other proposed methods the iron article is made the cathode in an electrolyte which is neutral, weakly acid, or alkaline—for example, a dilute solution of an alkali-metal salt, an acid, or an alkali. The removal of scale, however, is slow and irregular, spots of scale being frequently left at various points. Some of the scale is also loosened by the electrolytic hydrogen and drops into the bath. In neutral or alkaline solutions much of the scale is reduced to metallic iron, producing a rough irregular surface.

According to the present invention the iron article is made the cathode in an electrolyte of a strong aqueous solution of an acid and the scale is electrolytically and rapidly dissolved without dissolving any metallic iron. In the preferred mode of procedure the electrolyte consists of an aqueous solution of sulfuric acid having a specific gravity of about 1.20°, equivalent to an acid content of 27.1 per cent., although good results may be obtained with solutions having a specific gravity between 1.15° and 1.25°. When the acid concentration is below nine per cent., the action is too slow and irregular to be of much commercial value. The anode may be of lead and the current density at the cathode about forty to seventy amperes per square foot. While the process is not limited to the use of an electrolyte at any particular temperature, the removal of scale is found to be effected much more rapidly, efficiently, and economically at a high temperature. The electrolyte is preferably maintained at a temperature of 60° centigrade. Even higher temperatures may be used; but above 60° centigrade there is a greater tendency for the acid to dissolve the metallic iron, and a higher current density is required to prevent such solution.

Under the specified conditions the heavy scale on rolled-iron rods is completely removed in from two to three minutes. The disappearance of the scale is not due to the reduction of the oxid to metallic iron. It is found that the oxid is reduced simply to a lower state of oxidation and electrolytically dissolved. When a solution of sulfuric acid is employed, oxygen is liberated at the anode and ferrous sulfate is produced at the cathode. The solution of the oxid, however, is effected without dissolving any of the iron, as in processes in which the article is made the anode.

The use of an acid solution thus effects novel and unforeseen results at the cathode, enabling the scale to be electrolytically removed without dissolving metallic iron in so short a time and at so small a cost for electric current that the process is commercially available.

I claim—

1. The process of electrolytically dissolving iron-oxid scale from the surface of metal, which consists in subjecting the metal as a cathode to the action of an electric current while in contact with an electrolyte containing sulfuric acid of a specific gravity above 1.06°, as set forth.

2. The process of electrolytically dissolving iron-oxid scale from the surface of metal, which consists in subjecting the metal as a cathode to the action of an electric current while in contact with an electrolyte containing sulfuric acid of a specific gravity between 1.15° and 1.25°, as set forth.

3. The process of electrolytically dissolving iron-oxid scale from the surface of metal, which consists in placing the metal in a strong solution of an acid, and passing to the metal as a cathode an electric current of sufficient density to rapidly remove the scale, as set forth.

4. The process of electrolytically dissolving iron-oxid scale from the surface of metal, which consists in placing the metal in a solution of sulfuric acid having a specific gravity above 1.06°, and passing to the metal as a cathode, an electric current of a density not less than forty amperes per square foot, as set forth.

5. The process of electrolytically dissolving iron-oxid scale from the surface of metal, which consists in placing the metal in a solution of sulfuric acid having a specific gravity between 1.15° and 1.25°, and passing to the metal as a cathode, an electric current of a density not less than forty amperes per square foot, as set forth.

6. The process of electrolytically dissolving iron-oxid scale from the surface of metal, which consists in placing the metal in a strong solution of an acid, and passing to the metal as a cathode, from an anode of lead, an electric current of sufficient density to rapidly remove the scale, as set forth.

7. The process of electrolytically dissolving iron-oxid scale from the surface of metal, which consists in placing the metal in a solution of sulfuric acid having a specific gravity of about 1.20°, and passing to the metal as a cathode, from an anode of lead, an electric current of sufficient density to rapidly remove the scale, as set forth.

In testimony whereof I affix my signature in presence of two witnesses.

CHARLES J. REED.

Witnesses:
J. W. RITTER,
W. A. ROBBINS.